United States Patent [19]
Kingston et al.

[11] Patent Number: 5,903,551
[45] Date of Patent: *May 11, 1999

[54] MULTI-USER ACQUISITION PROCEDURE FOR POINT-TO-MULTIPOINT SYNCHRONOUS CDMA SYSTEMS

[75] Inventors: Samuel C Kingston; Thomas R. Giallorenzi, both of Salt Lake City; Randal R Sylvester, West Valley City; David W Matolak; Patrick J Smith, both of Salt Lake City, all of Utah

[73] Assignee: L-3 Communications Corporation, New York, N.Y.

[ * ] Notice: This patent is subject to a terminal disclaimer.

[21] Appl. No.: 09/005,938

[22] Filed: Jan. 12, 1998

Related U.S. Application Data

[63] Continuation of application No. 08/606,378, Feb. 23, 1996, Pat. No. 5,805,584.

[51] Int. Cl.$^6$ .................................................. H04B 7/216
[52] U.S. Cl. ........................ 370/335; 370/342; 370/516; 375/206
[58] Field of Search ..................................... 375/200, 344, 375/206, 327, 371; 370/335, 342, 320, 208, 209, 332, 503, 516, 350

[56] References Cited

U.S. PATENT DOCUMENTS

| | | | |
|---|---|---|---|
| 5,103,459 | 4/1992 | Gilhousen et al. | 375/1 |
| 5,295,152 | 3/1994 | Gudmundson et al. | 375/1 |
| 5,574,721 | 11/1996 | Magill | 370/18 |
| 5,583,853 | 12/1996 | Giallorenzi et al. | 370/441 |

FOREIGN PATENT DOCUMENTS

| | | |
|---|---|---|
| 0 630 120 A1 | 12/1994 | European Pat. Off. . |
| 0 654 913 A2 | 5/1995 | European Pat. Off. . |
| WO 92 02083 | 2/1992 | WIPO . |

*Primary Examiner*—Chau Nguyen
*Assistant Examiner*—Thinh Vu
*Attorney, Agent, or Firm*—Perman & Green, LLP

[57] ABSTRACT

Disclosed are methods for acquiring a forward channel in a point-to-multipoint CDMA system. One method includes the steps of (a) despreading a received CDMA signal with a first pn code that is known to be present in the received CDMA signal and obtaining a first measure of received signal level; (b) despreading the received CDMA signal with a second pn code that is known not to be present in the received CDMA signal and obtaining a second measure of received signal level; and (c) synchronizing to a desired channel using a difference between the first and second signal levels. In this method the first step of despreading despreads a continuously transmitted side-channel, and the step of synchronizing synchronizes to the side-channel. Also, the step of obtaining a first measure of received signal level obtains a correlation peak, and the step of obtaining a second measure of received signal level obtains a correlation null. Preferably, the steps of despreading and obtaining are accomplished iteratively over a range of n first pn code phase states and over a range of n second pn code phase states.

8 Claims, 7 Drawing Sheets

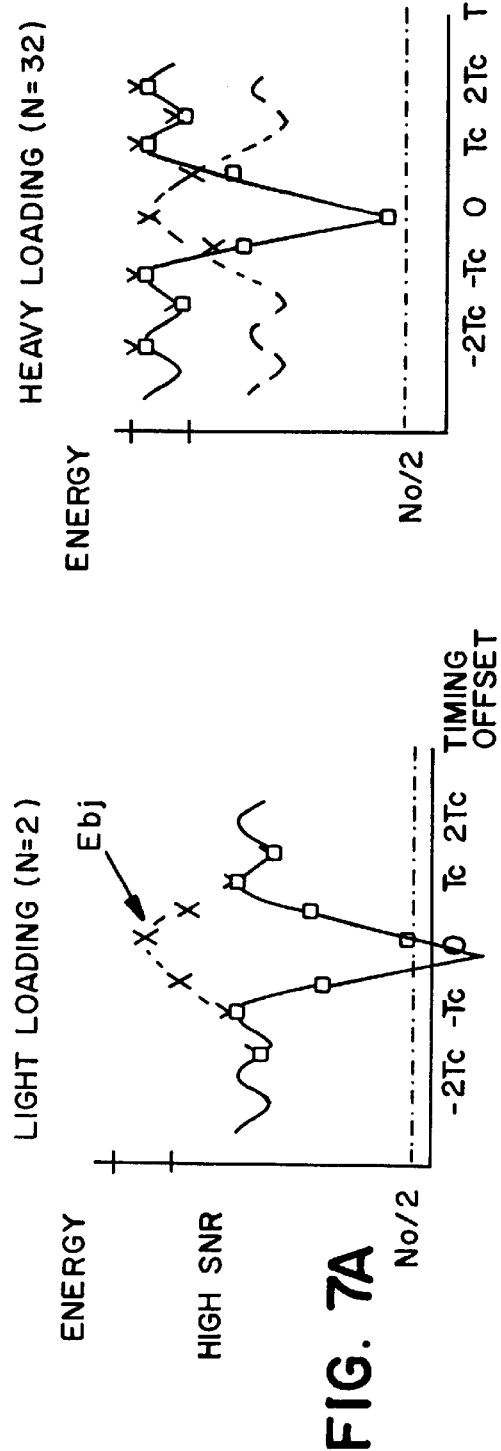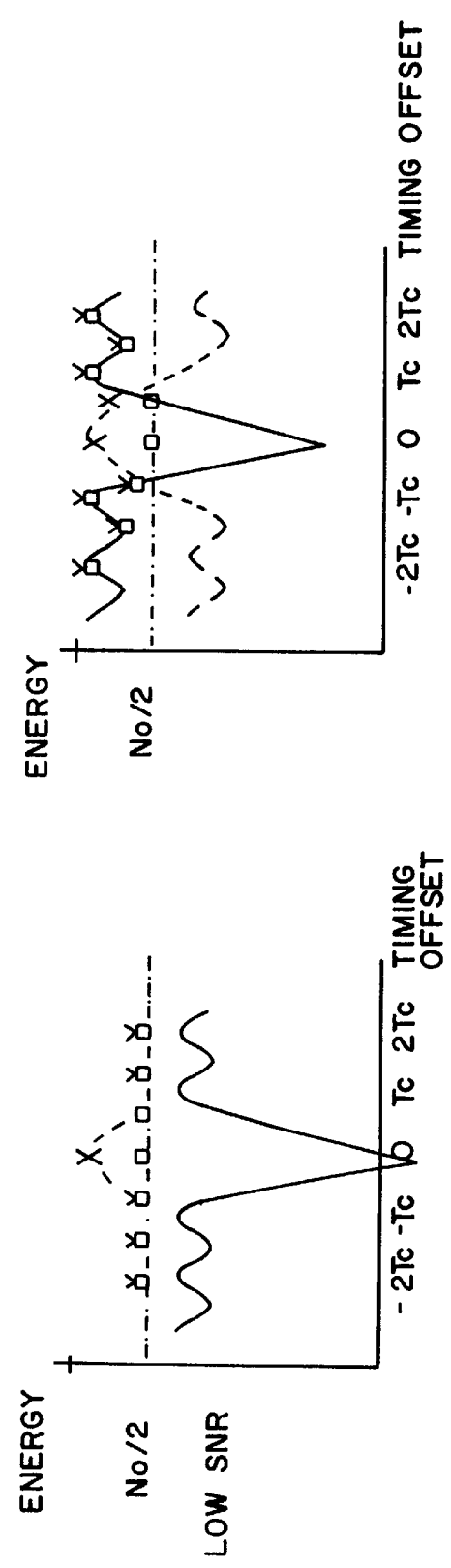

MULTI-USER ACQUISITION PROCEDURE FOR POINT-TO-MULTIPOINT SYNCHRONOUS CDMA SYSTEMS

CROSS-REFERENCE TO A RELATED PATENT APPLICATION

This patent application is a continuation of commonly assigned U.S. patent application Ser. No. 08/606,285, filed Feb. 23, 1996, entitled "A MULTI-USER ACQUISITION PROCEDURE FOR MULTIPOINT-TO-POINT SYNCHRONOUS CDMA SYSTEMS", now U.S. Pat. No. 5,805,584, by S. Kingston et al.

FIELD OF THE INVENTION

This invention pertains generally to code division, multiple access (CDMA) communication systems and, in particular, to direct-sequence (DS) point-to-multipoint synchronous CDMA communications systems.

BACKGROUND OF THE INVENTION

In a CDMA communications system a plurality of user communication signals can be transmitted within, i.e., share, a same portion of the frequency spectrum. This is accomplished by providing a plurality of different pseudonoise (pn) binary code sequences (e.g., one for each user) that modulate a carrier, thereby "spreading" the spectrum of the resulting waveform. In a given receiver all of the user signals are received, and one is selected by applying an assigned one of the pn binary code sequences to a correlator to extract only the signal energy intended for the receiver, thereby "despreading" the received CDMA transmission. All other (uncorrelated) user transmissions appear as noise.

One type of CDMA communication system is specified by a document referred to as EIA/TIA/IS-95. The system as specified uses a plurality of base stations that establish and maintain bidirectional direct-sequence (DS) CDMA links with a plurality of mobile stations (e.g., cellular telephones). One feature of the IS-95 system is the presence of a pilot channel that is transmitted by each base station.

The pilot channel is an unmodulated, direct-sequence spread spectrum signal that is transmitted continuously by each CDMA base station. The pilot channel allows a mobile station to acquire the timing of the Forward CDMA channel (i.e., from the base station to the mobile station), provides a phase reference for coherent demodulation, and provides a reference for signal strength comparisons between base stations for determining when to handoff. The pilot pn sequence is defined as a pair of modified maximal length PN sequences with period $2^{15}$ that are used to spread the Forward CDMA channel and the Reverse CDMA channel. Different base stations are identified by different pilot PN sequence offsets. A pilot pn sequence offset index is defined to be in units of 64 pn chips, relative to a zero offset pilot pn sequence. A pn chip is defined as one bit in the pn sequence. The pilot strength is defined as the ratio of received pilot energy to overall received energy.

Walsh functions are a class of $2^N$ time orthogonal binary functions that are used to establish orthogonality between the different pn binary code sequences used by the pilot and user channels.

The use of the pilot channels, while providing certain advantages in a CDMA system intended for use with mobile stations, may present disadvantages as well, particularly in systems where the user transceivers are fixed as opposed to mobile. For example, the pilot channels consume some amount of the available pn code sequences and signal energy, all of which could be otherwise allocated to the users of the system.

Also, in many detection approaches synchronization to the pn code timing must be achieved before carrier phase-lock can occur. In this case a non-coherent detection algorithm must be employed. Generally, non-coherent detectors rely on energy detection within a fixed bandwidth, as a range of code timing cells are searched. Upon locating the correct code timing, the detector energy level rises above a predetermined threshold level. A bit-sync loop then takes over to obtain the finer-resolution bit timing.

However, standard acquisition approaches are known to fail when the number of users becomes large. This is due to the fact that the noise power becomes comparable to the signal power when the user of a synchronous type of CDMA system is not synchronized. As a result, it becomes very difficult for the user's receiver to distinguish the correct pn timing phase from the incorrect phases resulting from the increased noise.

As can be appreciated, the acquisition technique is an important aspect of the receiver, in that its operation impacts the overall speed at which synchronization to the forward link occurs. If the time required to synchronize the user's receiver becomes excessive, the delay may be considered as objectional by the user.

OBJECTS OF THE INVENTION

It is a first object of this invention to provide methods and apparatus to enable a receiver to synchronize to a synchronous CDMA communications system.

It is a further object of this invention to provide methods and apparatus for implementing a synchronous CDMA system wherein a first forward channel transmits a null (inactive) pn code sequence that is orthogonal to all active codes, a second forward channel transmits an always-active pn code sequence, and wherein a receiver uses either the first forward channel, the second forward channel, or both of the forward channels to synchronize to the forward CDMA link.

SUMMARY OF THE INVENTION

The foregoing and other problems are overcome and the objects of the invention are realized by methods and apparatus in accordance with embodiments of this invention, wherein a user terminal is provided with circuitry and methods enabling the acquisition of a desired CDMA channel in the presence of a plurality of synchronous interfering channels.

In one aspect, this invention teaches a method for synchronizing to a forward channel in a CDMA system. The method includes steps of (a) despreading a received CDMA signal with a first pn code that is known not to be present in the received CDMA signal, (b) obtaining a measure of received signal level, and (c) using the obtained measure of the received signal level when setting a phase of a second pn code that corresponds to a desired forward channel that is to be received. In this method the step of despreading despreads a null channel, and the desired forward channel is a continuously transmitted side-channel that provides system-level information to all subscriber units or terminals.

In another aspect this invention teaches a method for acquiring a forward channel in a point-to-multipoint CDMA system. This method includes the steps of (a) despreading a received CDMA signal with a first pn code that is known to be present in the received CDMA signal and obtaining a first measure of received signal level; (b) despreading the received CDMA signal with a second pn code that is known not to be present in the received CDMA signal and obtaining a second measure of received signal level; and (c) synchronizing to a desired channel using a difference between the first and second signal levels.

In this method the first step of despreading despreads a continuously transmitted side-channel, and the step of synchronizing synchronizes to the side-channel. Also, the step of obtaining a first measure of received signal level obtains a correlation peak, and the step of obtaining a second measure of received signal level obtains a correlation null.

Preferably, the steps of despreading and obtaining are accomplished iteratively over a range of n first pn code phase states and over a range of n second pn code phase states. For a pn code phase state i of the plurality n of first and second pn code states, the method further determines a difference value between the first measure of received signal level and the second measure of received signal level; compares the difference value to a threshold value; and, if the difference value is greater than the threshold value, sets a pn code generator to output a pn code corresponding to the desired channel, wherein the outputted pn code is set at the pn phase state i. Else, if the difference value is not greater than the threshold value, the method instead increments the pn phase state i and re-executes the steps of despreading and obtaining.

In this method the step of determining the difference value includes a step of storing the determined difference value, and if none of the n difference values are greater than the threshold value, the method further includes a step of examining the stored difference values to select a stored difference value that has a largest value; and a step of setting the pn code generator to output the pn code corresponding to the desired channel, wherein the outputted pn code is set to a pn phase state that corresponds to the selected stored difference value.

In a further aspect, this invention teaches a synchronous CDMA communication system that operates in accordance with the foregoing methods.

BRIEF DESCRIPTION OF THE DRAWINGS

The above set forth and other features of the invention are made more apparent in the ensuing Detailed Description of the Invention when read in conjunction with the attached Drawings, wherein:

FIGS. 7A–7D are graphs that illustrate energy versus offset curves for the outputs of matched filters that are matched to the side-channel PN code (dashed line) and a null-code (solid line) for the cases of high and low SNR, as well as heavy and light loading. In these Figures the symbol X=matched filter output for the side-channel code, and the symbol □=matched filter output for the null-code.

DETAILED DESCRIPTION OF THE INVENTION

Figure 1:
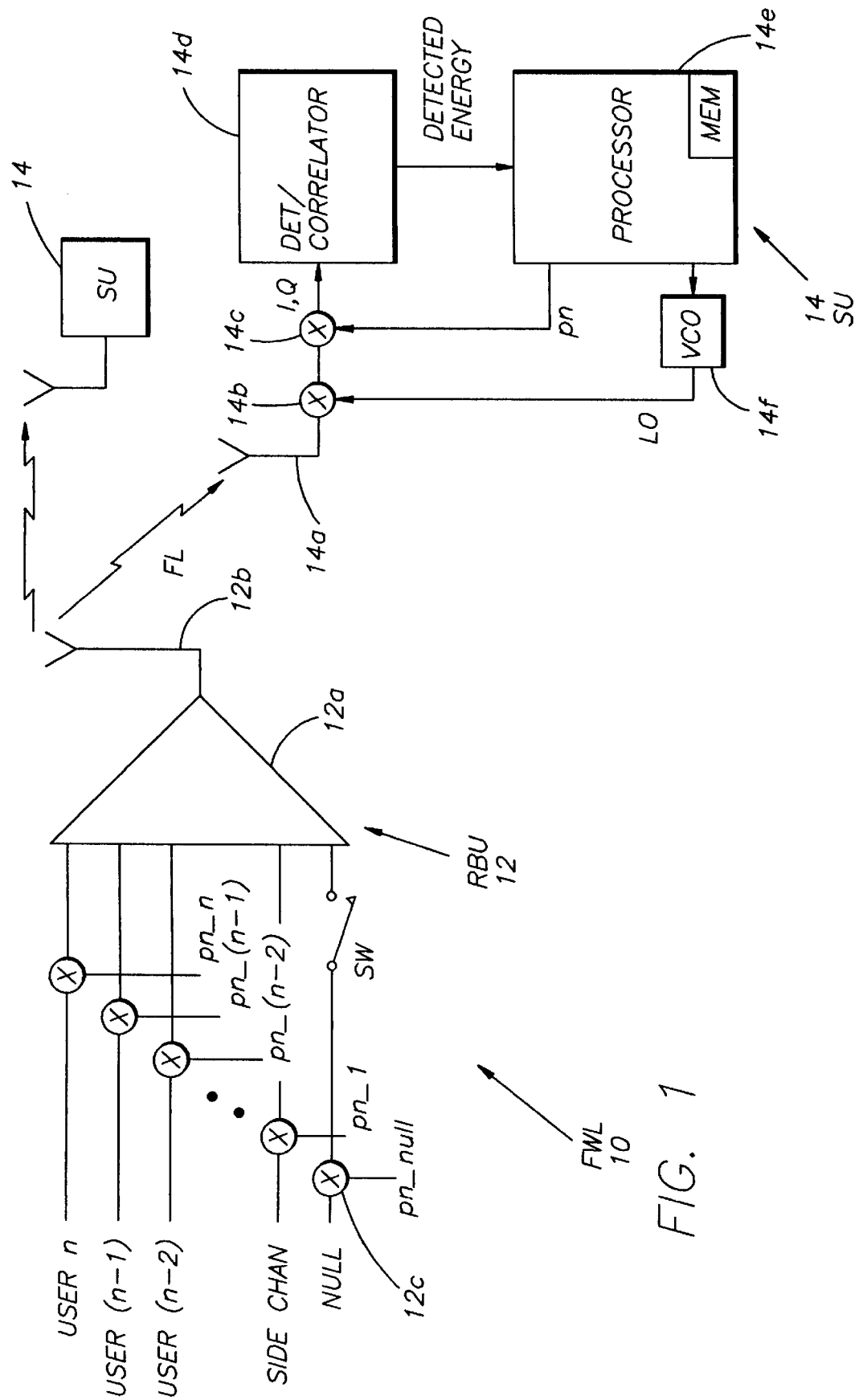
FIG. 1 is a simplified block diagram of a synchronous, DS-CDMA communications system that is constructed and operated in accordance with this invention, the system having a radio base unit (RBU) and a plurality of subscriber units (SUs).

Referring to FIG. 1, a synchronous CDMA communications system 10, which in presently preferred embodiments of this invention is embodied as a fixed wireless system (FWL), is considered herein to be a CDMA system wherein forward link (FL) transmissions from a radio base unit (RBU) 12 for a plurality of user or subscriber units (SUs) 14 are bit and chip aligned in time, and wherein the SUs 14 operate in accordance with the teaching of this invention for receiving the FL transmissions and for synchronizing to one of the transmissions. The FWL is suitable for use in implementing a telecommunications system that conveys voice and/or data between the RBU 12 and the SUs 14.

The RBU 12 includes circuitry for generating a plurality of user signals (USER_1 to USER_n), a side channel (SIDE_CHAN) signal that is continuously transmitted, and a NULL signal. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The illustrated arrangement is for one frequency (carrier) channel, it being realized that the RBU 12 is capable of transmitting a plurality of such frequency channels. By example, each frequency channel includes up to 31 code channels, and has a center frequency in the range of 2 GHz to 3 GHz.

Each SU 14 includes an antenna 14a, a mixer 14b for down-converting the received signal, a correlator 14c wherein the user's transmission is obtained by despreading the received signal with a local pn code, and a detector and correlator 14d. Suitable embodiments for the detector are a non-coherent square law detector shown in FIG. 2 and also a non-coherent absolute value detector shown in FIG. 3. The SU 14 also includes a local processor 14e that is responsible for managing the operation of the SU 14. These management functions include generating a variable local oscillator (LO) signal, such as is obtained from a voltage controlled oscillator (VCO) 14f, and providing the pn binary code sequence that is assigned to the SU 14 for despreading the user's signal. The processor 14e is also responsible for executing one or more of the acquisition methods in accordance with this invention. Although the SU 14 is capable of also transmitting a DS-CDMA signal to the RBU 12 on a return link, these functions are not germane to the teaching of this invention and are thus not illustrated.

For the presently preferred embodiments of this invention the antennas 12b and 14a have a line-of-sight relationship, the SUs 14 are fixed in location with respect to the RBU 12, and the antennas 12b and 14a are boresighted during installation of the SU 14. However, and as will be discussed below, the teachings of this invention are not limited to only this particular presently preferred arrangement.

The ensuing description assumes the use of a DS signal, a(t), with code symbol duration $T_s$, multiplied by a spreading sequence c(t), with chip duration $T_c$ and a null-to-null bandwidth $W_c = 2/T_c$. The symbol rate for each SU 14 is fixed at $1/T_s$, and the chipping rate at $1/T_c = P/T_s$. All of the pn codes are mutually orthogonal when aligned, and are assumed to be accurately aligned during normal operation. In the presently preferred embodiments of this invention the pn codes are selected from a set of randomized Walsh-Hadamard codes. The teaching of this invention is not, however, limited to only signals having these characteristics. By example, the set of pn spreading codes can be selected from any set that exhibits low cross-correlation at zero relative shift.

Figure 2:
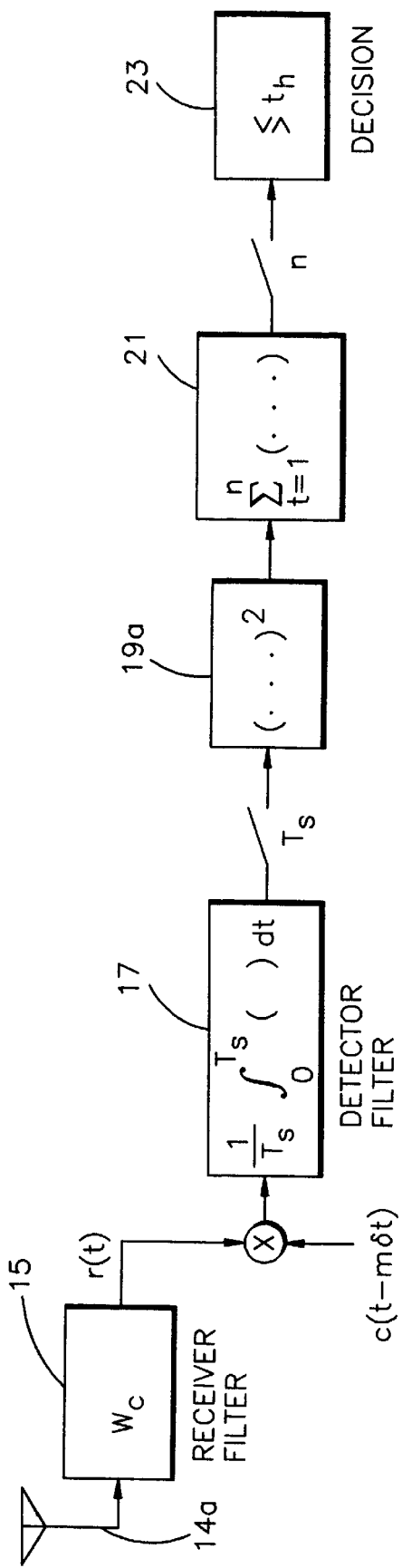
FIG. 2 is a block diagram of a first embodiment of the SU receiver detector of FIG. 1, in particular a non-coherent square law detector.
Figure 3:
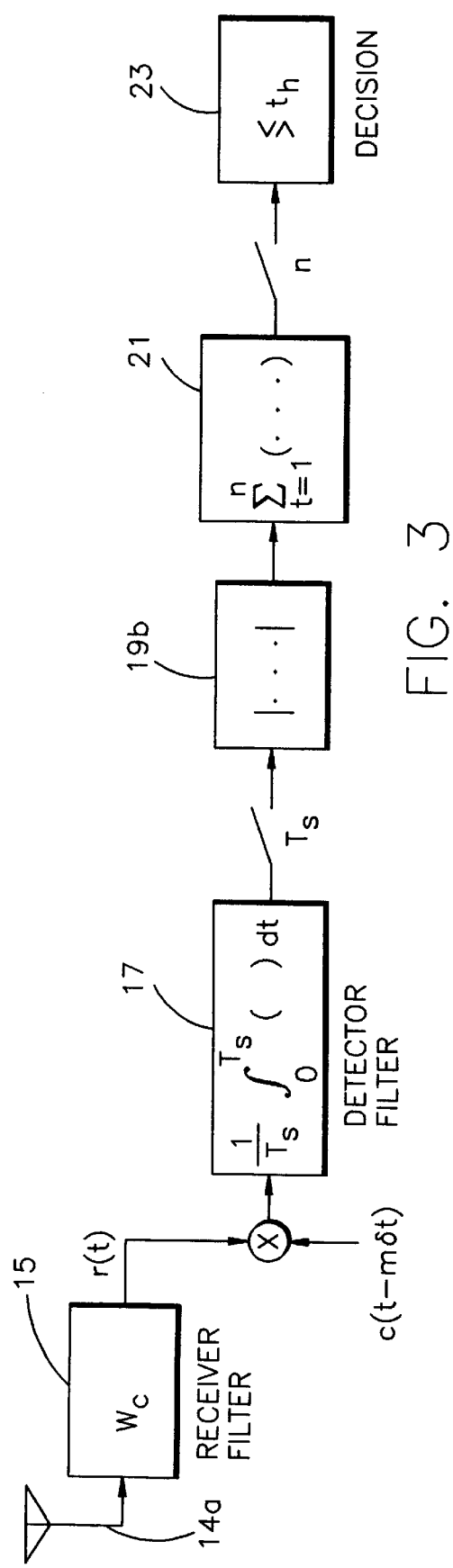
FIG. 3 is a block diagram of a second embodiment of the SU receiver detector of FIG. 1, in particular a non-coherent absolute value detector.

In the absence of multi-user interference, the received signal can be written as $r(t)=a(t-r)c(t-r)+n(t)$, where n(t) represents white gaussian channel noise. r(t) is multiplied by successive shifts of the spreading sequence, $c(t-m\delta t)$, in an attempt to estimate the timing offset, r. The detector filter 17 of FIGS. 2 and 3 is a finite ($T_s$) integrator with an equivalent noise bandwidth $W_s = 1/T_s$. Within this bandwidth, the effective noise power spectral density, $\frac{1}{2}N_o$, is unchanged by the integrator. When $c(t-m\delta t)$ is synchronous with r(t); the pn spreading code is collapsed, and the integrator produces mean values of the DS signal, a(t-r). Assuming non-synchronous operation, most of the signal energy falls outside the bandwidth of the detector filter 17 and, to a good approximation, the detector input can be taken as white gaussian noise only. For worst case non-synchronous operation, the signal energy is reflected back into the spread bandwidth, $W_c$.

The sum of n samples of a squared gaussian process is central $\chi^2$ distributed with n degrees of freedom, and has a bandwidth (near DC) twice that of the detector filter 17. The central $\chi^2$ distribution with n degrees of freedom can be written $$Py(y) = \frac{1}{\sigma^n 2^{n/2} \Gamma(n/2)} y^{n/2-1} e^{-y/2\sigma^2}, \quad y \geq 0,$$

where $\sigma$ is the variance of the gaussian process.

Given spread code synchronization (i.e., $m\delta t \approx r$), the spectrum of the received signal is collapsed to the data bandwidth, thus increasing the total energy within the detector filter 17. Because the phase of the received signal rotates freely with respect to the reference, this waveform is not DC, even for a constant energy signal. It would thus appear that the output of the detector should again be central $\chi^2$ distributed, but with a larger mean value than for the noise only case. However, the phase rotation rate is assumed to be slow enough that the signal component can be treated as deterministic, and hence the ith independent sample of the detector filter output is distributed normally with mean $s_i$ and variance $\sigma^2$ determined by the noise component. The integrator output is then characterized by a non-central $\chi^2$ distribution with n degrees of freedom, and a non-centrality parameter:

$$\lambda = \sum_{i=1}^{N} s_i^2 = nS,$$

where S represents the average signal power. The non-central $\chi^2$ distribution with n degrees of freedom can be written as:

$$Py(y) = \frac{1}{2\sigma^2} \left(\frac{y}{\lambda}\right)^{(n-2)/4} e^{-(\lambda+y)/2\sigma^2} I_{n/2-1}\left(\frac{\sqrt{y\lambda}}{\sigma^2}\right), \quad y \geq 0.$$

Finally, a summation of n samples from block 21 is compared in block 23 to a preset threshold, $t_h$. The threshold and the number of samples are set to achieve a probability of detection $\geq P_d$ simultaneously with a probability of false alarm $\leq \alpha$. Give $t_h$, $P_d$ can be determined by integrating the non-central $\chi^2$ distribution from $t_h$ to $\infty$. The probability of false alarm, $\alpha$, is determined by integrating the central $\chi^2$ distribution from $t_h$ to $\infty$. As the integration time, T, becomes larger, the spread between the two distributions also becomes larger. At some point, the required detection probability can be achieved while simultaneously achieving the target false alarm probability. The minimum number of samples required to achieve the target detection and false alarm probability criteria determines the observation window of the detector, $T=nT_s$.

However, normally some time uncertainty will exist, and some number (Q) of time cells must be searched. The mean acquisition time is then determined as follows: Given a $H_o$ case (a noise only case), the time required to search a single time cell is given by the expression $$T_o = T + \alpha KT,$$

where K is referred to as the cost for a false alarm. If it is assumed that, upon exceeding the threshold, a verification procedure is begun, and that this verification procedure includes a second integration of length KT, which is long enough to assure that the probability of a second false alarm is negligible, then $T_o = (1+\alpha K)T$. On average, ($\frac{1}{2}Q-1$) time cells must be searched before encountering the correct cell. Next, the time required to search a time cell given by a $H_1$ case (a signal present case), is given by the expression $$T_1 = P_d(1+K)T + (1-P_d)(\frac{1}{2}QT_o + T_{acq}).$$

The first term corresponds to a successful detection, in which case a verification procedure is also required. The second term corresponds to a detection failure (in which case the acquisition procedure must be started from the beginning, but increased by $\frac{1}{2}QT_o$ (since all time cells must now be searched). The acquisition time is therefore given by the expression $$T_{acq} = (\frac{1}{2}Q-1)T_o + T_1.$$

Substituting and rearranging, one arrives at the expression $$T_{acq} = \frac{1}{P_d}[(1+\alpha K)(Q-1-1/2QP_d)(1+K)]T$$

Hence, given the signal-to-noise ratio (SNR), the required detection probability, $P_d$, the false alarm probability, $\alpha$, and a cost factor, one can compute the necessary integration time, T. Then, given T and the uncertainty, Q, the mean acquisition time, $T_{acq}$, can be determined.

For a particular value of $E_s/N_o$ at the input filter, the input signal-to-noise ratio is given by $$SNR_c = \frac{S}{N_c} = \frac{2}{T_s W_c} \frac{E_s}{N_o}$$

Assuming that the signal is AGC controlled at the output of the SU receiver filter 15, then $S+N_c=1$, from which it follows that $$S = \frac{SNR_c}{1+SNR_c} \text{ and } N_c = \frac{1}{1+SNR_c},$$

where S is the signal power, and $N_c$ the noise power at the output of $W_c$. In addition, $N_o=2N_c/W_c$. The noise power at the output of the detector filter 17, $W_s$, is then $N_s=N_o W_s/2$, from which the signal-to-noise ratio in the energy detector 19a or 19b can be calculated as $SNR_s=S/N_s$. The probability distribution functions for each hypothesis are then completely determined by the parameters:

$$\sigma_0^2 = \sigma_1^2 = N_s \text{ and } \lambda = nS.$$

The foregoing analysis is now generalized to a multi-user channel of most interest to this invention. By example, there may be $M \leq 30$ active users (SUs 14) in the CDMA communication system 10, each of which receives coded information symbols from the RBU 12, with an assigned length P=32 code. All of the pn codes are mutually orthogonal when aligned, and are assumed to be accurately aligned during normal operation. The symbol rate for each SU 14 is fixed at $1/T_s$, and the chipping rate at $1/T_c=P/T_s$. The RBU 12 transmits all active channels together synchronously and uniformly, and hence the channel power levels and timing offsets received at any one SU 14 are substantially equal.

In addition to the user channels, there are two additional channels which all SUs 14 make use of. One, which is never active, is referred to as the above-described null-channel. Although the null-channel is assigned a unique pn code (referred to herein as the null-code), which is orthogonal to every active code, the null-code is not actually transmitted. That is, the null-code can be considered as a "missing" code. This is schematically shown in FIG. 1 by the open switch (SW) placed in the NULL signal path. The switch (SW) could also be placed in the pn__null path, such that the pn code assigned to the null channel (pn__null) does not reach the associated multiplier (spreader) 12c.

The second channel, referred to above as the side-channel, is always active. The side channel provides side-information to the SUs 14 (e.g., system access information, etc.). The side-channel is used as well for code-synchronization, as described below.

In a single-user acquisition technique or test (SUT), only a side-channel statistic is employed, while in a multi-user acquisition technique or test (MUT), the null-channel statistic is employed. It is also within the scope of this invention to employ two different statistics; one corresponding to the null-channel and the other to the side-channel, as explained below.

Single-user technique: For this measurement, the side-channel pn code is used as the SU 14 correlation code, $c(t-m\partial t)$, as shown in the non-coherent square law detector block diagram of FIG. 2 and also the non-coherent absolute value detector block diagram of FIG. 3. The single-user technique makes use of this statistic alone in an attempt to locate a correlation peak between the copy of the side-channel pn code stored in the SU 14 and the active side-channel itself. The maximum point on this peak occurs when the codes are aligned.

The multi-user technique: For this measurement, the null-code is used as the correlation code. The multi-user test makes use of this statistic alone in an attempt to find a correlation null (as opposed to peak) between the copy of the null-code stored in the SU 14 and the active channels. The correlation null results from the mutual orthogonality of every possible active code with the null-code, and coincides with code alignment.

It has been found that the single-user test may be reduced in effectiveness when M approaches the maximum number of allowed active users. This is due to the fact that the multi-user interference level drops just as the side-channel correlation signal rises, in a nearly self-canceling fashion. Similarly, when M is small, it has been found that the multi-user test may be reduced in effectiveness, because the correlation null can be masked by ambient noise.

Figure 4:
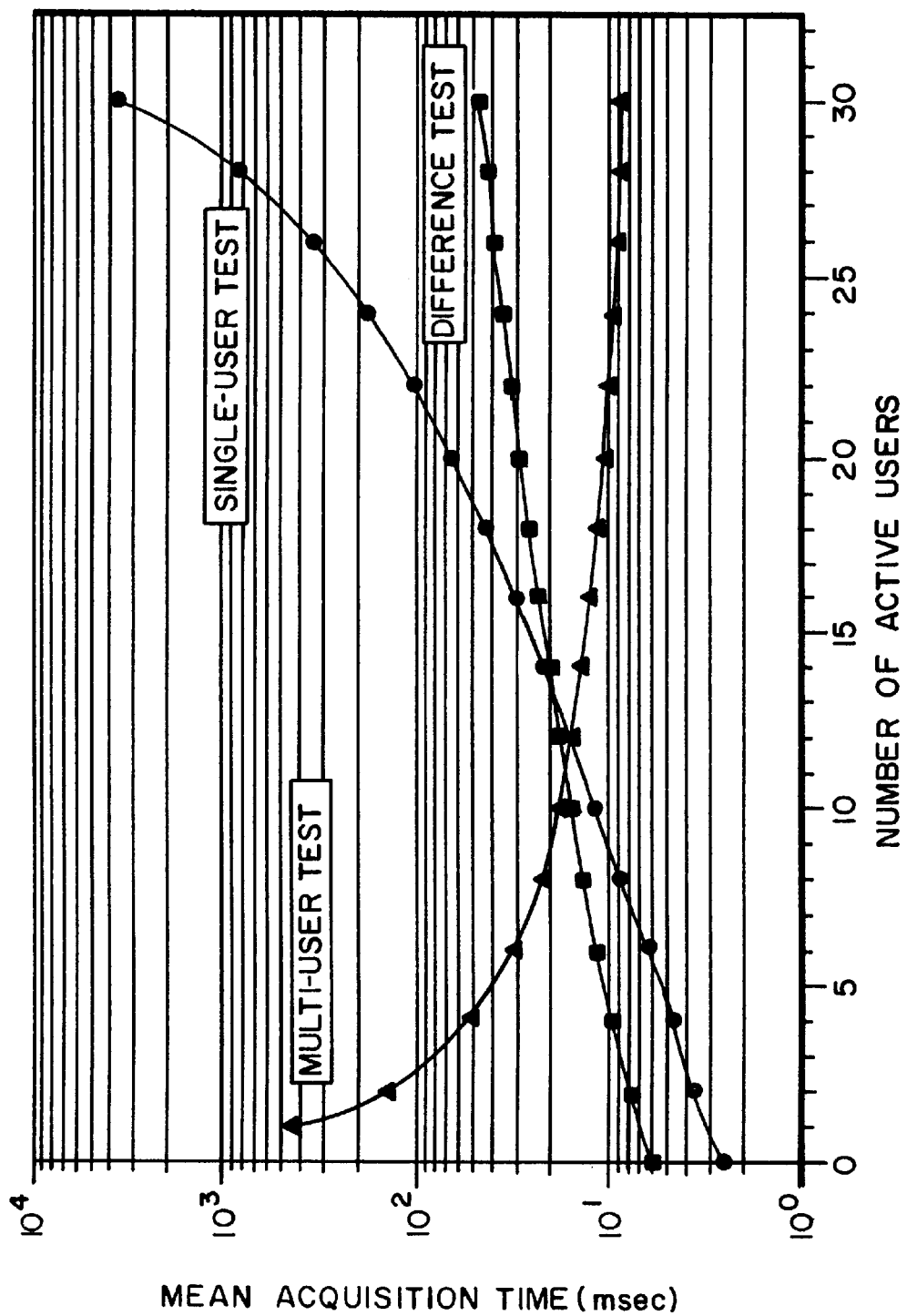
FIG. 4 is a graph that illustrates the relative mean acquisition time performance of the single-user, multi-user, and difference tests of this invention, for the case $E_s/N_o$=6 dB, $P_d$=0.995, and $\alpha$−0.01, and for a range of numbers of active users.

In order to compensate for these effects, it is preferred to use a difference between these two statistics when acquiring the FL. Hence, for large M, the single-user statistic dominates, and for small M, the multi-user statistic dominates. But, in either case, the difference between the two statistics changes significantly (i.e., becomes larger) as the pn code timing approaches the lock point. This advantage is mitigated somewhat by the doubling of an observation window, $T=2nT_s$. However, and referring now to FIG. 4, it can be readily seen that the use of the difference test provides an overall advantage in mean acquisition time when compared over the full range of possible numbers of active users.

The detection in accordance with this invention is thus preferably performed on two probability distribution functions (pdf) resulting from the difference between the two statistics described above. As in the single-user detection case, one pdf corresponds to a $H_o$ case, or codes mis-aligned case, the other to a $H_1$ case, or codes aligned case. In either case, and because the two statistics are computed sequentially, the noise components are essentially uncorrelated. The pn codes are length P=32, and the timing is searched in the SU 14 in half-chip increments ($\delta t = T_c/2$), thus giving Q=64 possible positions. The time cell yielding the best signal level will therefore, at worst, be off by $\frac{1}{4}T_c$.

Given the $H_o$ case, both the single-user and multi-user tests yield ambient gaussian white noise and multi-user interference. Since the multi-user codes are uncorrelated with the test code, both noise components are assumed gaussian, and hence central a $\chi^2$ distributed at the detector output. The channel noise variance is $N_s=\frac{1}{2}N_o W_s$, where $\frac{1}{2}N_o=N_c/W_c$ is the two-sided noise spectral power density. Hence $N_s=N_c T_s/2T_s=\frac{1}{2}N_c/P$. The worst case multi-user interference power is $I_s=\frac{1}{2}I_o W_s$, where $\frac{1}{2}I_o$ is the two-sided interference spectral density.

It should be noted that the interference density varies over the null-to-null bandwidth of the receiver filter 15 of FIGS. 2 and 3. Of most interest, however, is the density near DC. The equivalent interference bandwidth at this power density is $\frac{1}{2}W_c=1/T_c$. Hence, $\frac{1}{2}I_o=I_c T_c$, and $I_s=I_c T_c/T_s=I_c/P$. For the $H_o$ hypothesis, then $\sigma_0^2=I_s+N_s+S/P=1/p[1-\frac{1}{2}N_c]$, where S/P represents the contribution of the side-channel.

Figure 5:
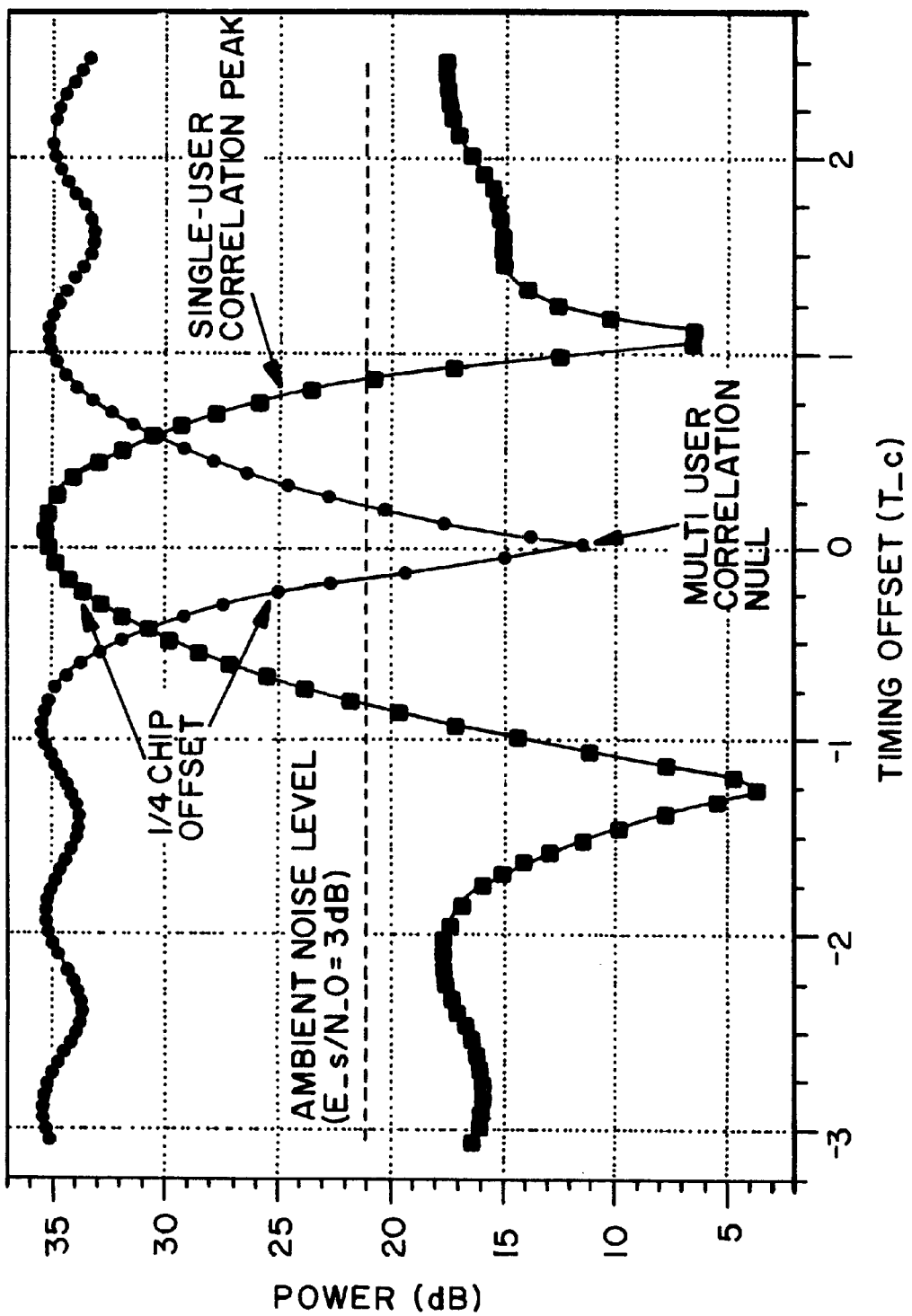
FIG. 5 is a graph that illustrates an average multi-user interference power and average side-channel correlation power versus code timing offset, with 3 pole Butterworth transmitter and receiver filters, and 30 active users.

Given the $H_1$ case, the single-user test yields the ambient white gaussian noise term and a deterministic signal component, and hence contributes a non-central $\chi^2$ distributed random variable at the output of the detector 12d. The multi-user test yields ambient white gaussian noise which contributes a central $\chi^2$ distributed random variable. This assumes, of course, that the multi-user interference can be ignored due to the mutual orthogonality of the aligned pn spreading codes. However, and because of filtering, the pn codes are typically not strictly orthogonal. It can be shown that, with 3-pole butterworth filtering, the interference null depth is approximately 25 dB upon pn code alignment. Thus, for worst case fades ($E_s/N_o \approx 3$ dB), the interference null can be well below the ambient white gaussian noise level. Another factor to consider results from the fact that the worst case alignment offset of ¼$T_c$ will have the effect of weakening the interference null and the signal correlation peak. From the graphs shown in FIG. 5, the multi-user correlation null can be seen to lose as much 14 dB and the single-user correlation peak about 2 dB. Thus, these effects are taken into consideration. It can be assumed however, that for a worst case fade, the noise variance is approximately $\sigma_1^2 = N_s$ for both the single-user and multi-user statistics. The non-centrality parameter $\lambda$ is equal to nS.

The probability distribution function for a random variable which is the difference between two other independent random variables, Z=X−Y, can be determined from the integral:

$$fz(z) = \int_{-\infty}^{+\infty} fx(x) fy(x-z) dx,$$

which is similar to a convolution integral. The $H_o$ and $H_1$ distributions can thus be obtained by direct integration, or from the inverse fourier transform of the product of modified forms of the characteristic functions for the central and non-central $\chi^2$ distributions.

For the multi-user acquisition case, the SU 14 automatic gain control (AGC) function is assumed set such that $S+N_c+I_c=1$, where $I_c=MS$ is the multi-user interference power. Hence, $(M+1)S+N_c=1$. As is also the case for the single-user approach, the SNR can be defined as:

$$SNR_c = \frac{S}{N_c} = \frac{2}{T_s W_c} \frac{E_c}{N_o} = \frac{1}{P} \frac{E_s}{N_o},$$

It thus follows that:

$$N_c = \frac{1}{(M+1)SNR_c + 1}, \quad S = \frac{SNR_c}{(M+1)SNR_c + 1}, \text{ and}$$
$$I_c = \frac{MSNR_c}{(M+1)SNR_c + 1}$$

Upon setting $\lambda$=nS, the probability distributions are completely determined up to the number of degrees of freedom, which is adjusted to meet the probability of detection and false alarm criteria:

$$P_d = \int_{t_h}^{\infty} Pz_1(z) dz \text{ and } a = \int_{T_h}^{\infty} Pz_0(z) dz$$

for some threshold $t_h$.

Based on the foregoing, and in accordance with a first aspect of this invention, there is provided a method for the SU 14 to acquire the correct code timing for a synchronous CDMA forward channel link in the presence of some amount of multi-user interference (MUI). This method exploits the orthogonality of the pn codes used to determine the proper code phase by purposely despreading a pn code (i.e., the null code) which is known to not be present. This is done to overcome the problem that arises when using a conventional acquisition procedure when many users are active. In this case the interference energy of P−1 interfering users, with processing gain P, can be nearly as strong as the energy of the desired user's signal. As a result, the standard acquisition approach, wherein a detection is declared when the energy of a matched filter output (or sliding correlator output) is larger than a threshold, is not viable in a heavily loaded system.

To simplify the discussion of the method, it is assumed that the frequency offset between the carrier of the incoming signal and the receiver's local oscillator is zero.

Figure 6:
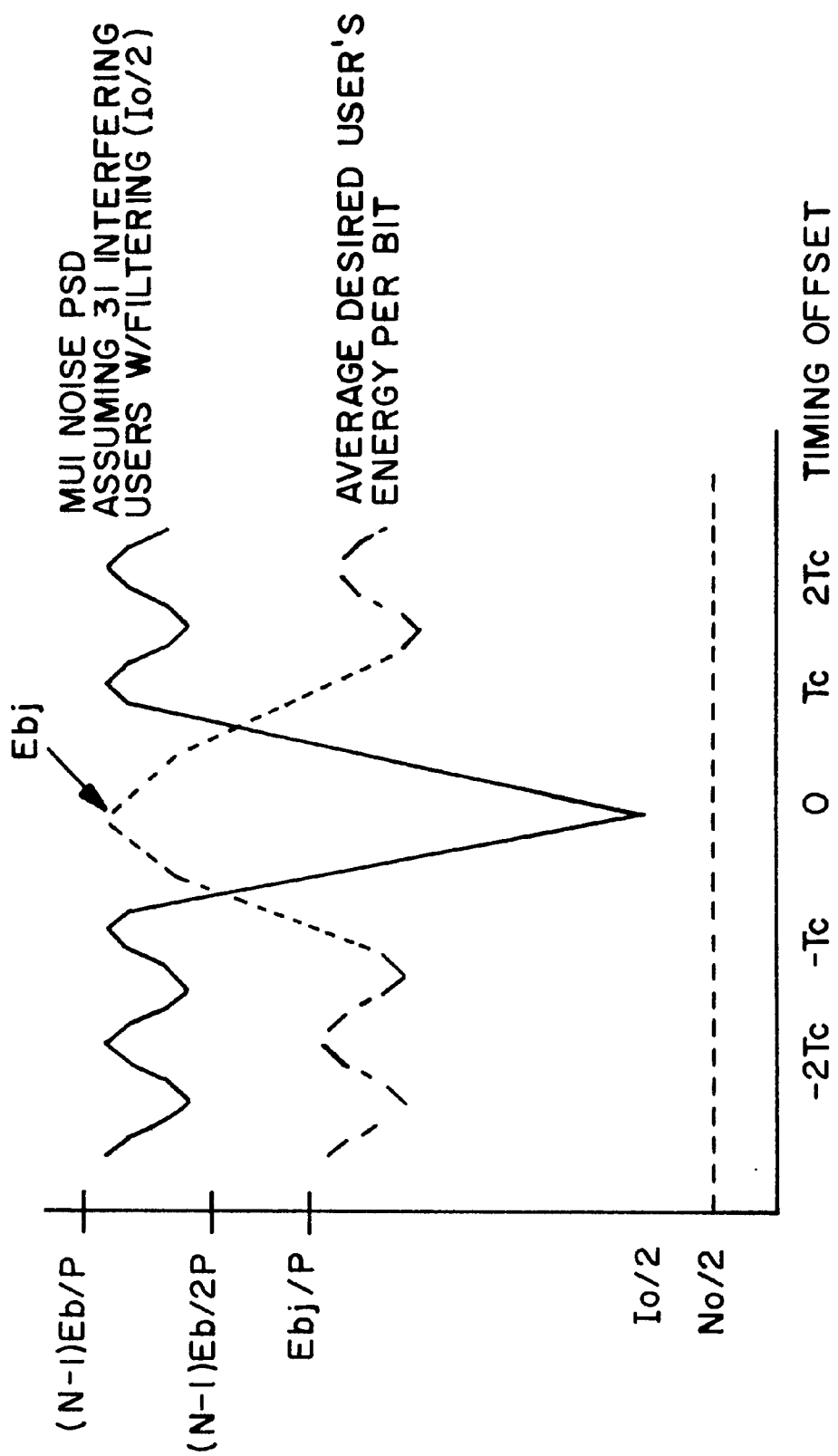
FIG. 6 is a graph that illustrates energy versus offset for a desired subscriber unit, for multi-user interference, and for background noise.

FIG. 6 illustrates the energy of the matched filter output due to the desired user's signal, due to the interfering users, and due to the background noise as a function of the timing offset of the matched filter. It should be noted that on the forward channel, the user signals are all assumed to perfectly synchronized with each other. The different curves shown in FIG. 1 represent the various components of the received signal, and the sum of these components make up the received strength. It is important to note that the MUI energy due to a receiver chip timing offset is comparable to the energy of the desired user's signal when the receiver is not offset. The implication of this is that a standard acquisition algorithm would not be able to easily distinguish the difference between the offset and synchronized phases. In fact, unless additional averaging takes place, the signal energy is essentially equal to the noise variance, which implies a detection signal-to-noise ratio (SNR) of approximately 0 dB.

It should also be noted that the noise due to MUI and the noise due to background noise are both zero mean noise processes. In the conventional detection procedure, the absolute value of the larger of I and Q despreader outputs are taken and the results are averaged over some dwell time. The fact that the noise has a zero mean implies that it is possible to increase the decision SNR by averaging the detection statistics. However, in the case of a heavily loaded system, the averaging time would be required to be long in order to create a large enough SNR to determine reliably whether the receiver is correctly synchronized to a signal.

In contrast with the standard acquisition approach, and in accordance with an aspect of this invention, if the SU receiver instead despreads a PN code which is not transmitted, then the noise will be "tuned out" when the receiver comes into alignment with the interfering signals. This implies that the SU receiver can look for the "hole in the noise" which occurs at the zero offset phase, and thus determine when the noise energy at a sliding correlator output drops below a threshold. At this time the acquisition circuit can declare that a lock has occurred. This technique has been referred to above as the multi-user test (MUT).

Although this approach provides significant advantages over the conventional acquisition technique, two problems can arise during the use of the MUT approach.

The first problem results from the fact that the number of interfering users is not constant, and so the absolute level of the MUI is not fixed. This complicates the acquisition problem because in the lightly loaded case, where the background noise is non-negligible, the noise power may not decrease at the output of the matched filter when the code alignment becomes perfect.

The second problem results from the fact that the threshold of noise power at which a lock should be declared is a function of the number of currently active interfering users, and so some type of calibration procedure should be performed to set this threshold. Such a calibration procedure may involve scanning the possible code phases in half-chip steps to determine an average energy level and the lowest energy level. If the lowest energy level is found to be lower than the average level by more than some threshold amount, then the lowest energy level phase may be declared to be the lock phase. The penalty associated with this approach, however, is that the calibration procedure can require a substantial amount of time to perform, namely 2P times the dwell time. While a lengthy acquisition time for the SU is not a serious drawback, since it only occurs at startup and after long deep fades, it would be preferable to avoid a relatively long mean time to acquisition if possible.

FIGS. 7A–7D illustrate four possible situations of loading (number (N) of active interfering users) and background noise levels. In each case, the matched filter or sliding correlator output is shown, when matched to the side-channel pn code and to the null pn code (i.e., the pn code that is not transmitted). It is clear that the behavior of the null pn code and side-channel pn code sliding correlators varies by a large amount depending on the channel loading and background noise level.

Figure 8:
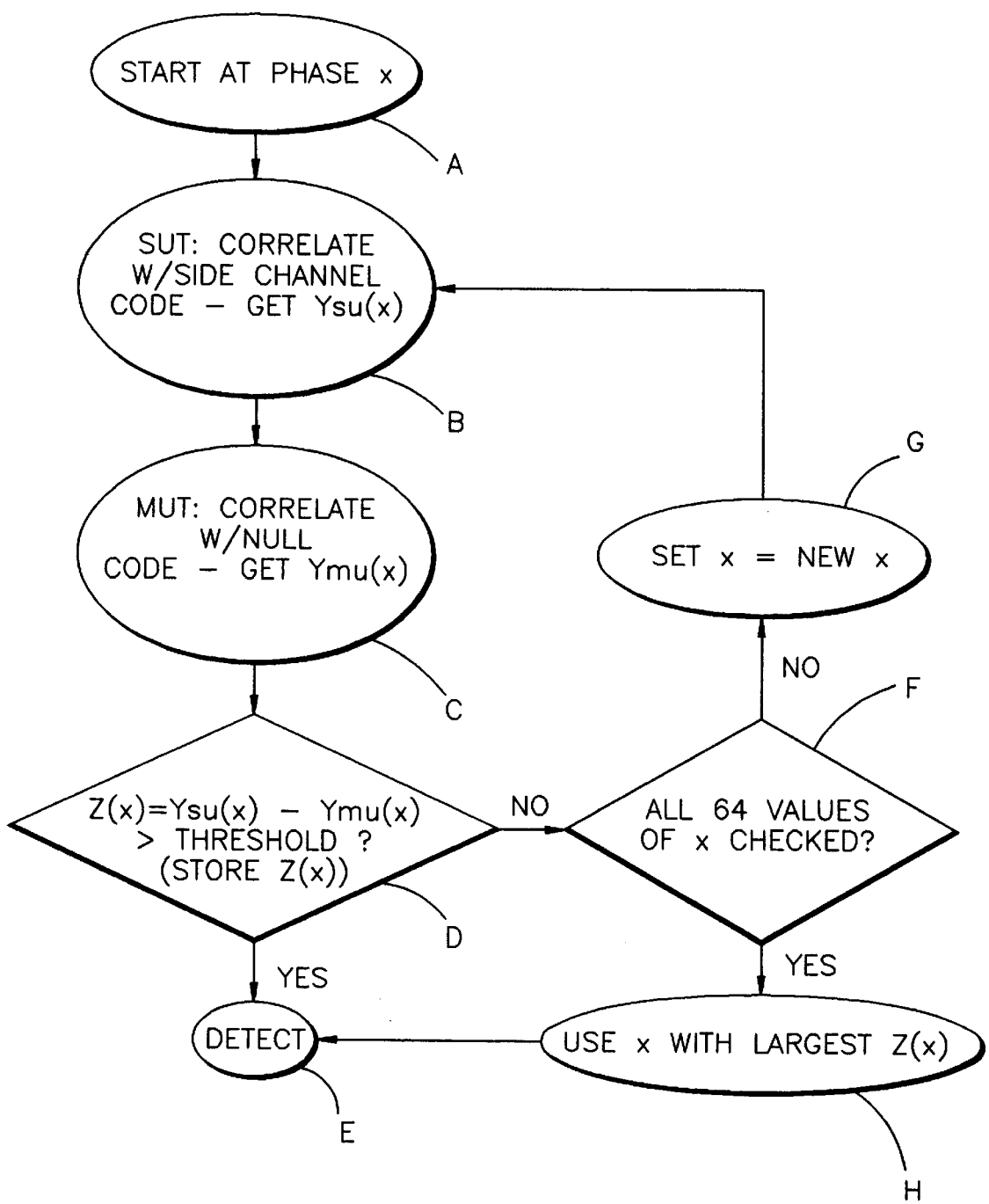
FIG. 8 is a logic flow diagram of a channel acquisition method in accordance with this invention.

In a presently preferred embodiment of this invention both the signal user test (SUT) and the multi-user test (MUT) are performed, and the results are subtracted at each phase state. The procedure for this presently preferred technique is shown in the logic flow diagram of FIG. 8.

In this procedure, at each of the 2P phase states (for example 64 phase states), and beginning with a phase x (Block A), the SU receiver first performs the signal user test (SUT) by averaging the absolute value of some number of the larger of the I and Q despreader outputs (Block B). The SU receiver then performs the multi-user test (MUT) at Block C by doing the same averaging with the despreader employing the null pn code. The difference of these two test statistics is then computed (Block D) and if the difference, $Z(x)$, is larger than a threshold, a detection is declared (Block E). If the threshold is not exceeded, the SU processor 12e stores $Z(x)$ in an associated memory (MEM). At Block F a determination is made by the processor 12e if all 64 possible phase states of phase x have been checked. If no, control passes to Block G where the processor 12e slips the receiver's chip-clock to the next phase state, and the loop is re-entered at Block B.

If all 64 possible phase states are exhausted and no detection is declared at Block F, then there at least two options. The first option is that the SU processor 12e can sort the stored $Z(x)$ values and pick the phase state, x, with the largest $Z(x)$ value (Block H). The second option is that the receiver can continue slipping the x value through the 64 possible states again in the event that a temporary fade was responsible for the missed detection on the first pass.

This method of using the relative differences of the two tests (SUT and MUT), rather than an absolute test result, provides a test which is more robust, as well as a test which yields a lower mean time to acquisition than the use of an absolute test.

The overall purpose of the method is to provide a multi-user acquisition procedure for use by the SU 14 in acquiring the forward side-channel in the presence of many interfering forward channel signals. An important aspect of this method is that by comparing the result of the single user test (SUT) to that of the multi-user test (MUT), for each possible phase state, the relative difference between the two tests is better able to distinguish the correct phase state from all of the incorrect phase states.

The presently preferred embodiment of this invention assumes that no timing (reference) information is present, and up to, by example, 10 symbol rates of frequency uncertainty exists. It is also assumed that all interfering channels transmit independent random data.

Further in accordance with an aspect of this invention, a single acquisition sequence, also referred to as a "look", includes setting a particular chip code phase and carrier frequency and thereafter accumulating a detected value (i.e., a magnitude of an in-phase (I) component plus a magnitude of a quadrature (Q) component) of, nominally, 64 symbols. This operation is accomplished by the detector circuitry 12d, and the resulting value is supplied to the processor 12e which controls the overall acquisition sequence. By example, at 17 Kbaud this operation can occur every 3.8 milliseconds.

The acquisition technique in accordance with this embodiment of the invention is comprised of four components; referred to herein as channel evaluation, code phase search, carrier frequency pull-in, and carrier lock.

The channel evaluation component operates to search for a region of orthogonality during periods of heavy use (high communications traffic). A pn spreading code for an unused channel (the null channel) is supplied and a timing search is performed at a nominal carrier frequency in half chip steps. A reduction in a detected signal energy level is assumed to be indicative of the presence of a region of orthogonality, i.e., a pn code that is approximately equal to the proper pn timing. If look values are found below a threshold proportional to a mean look value, timing detection is declared. Longer looks at plus and minus ½ chip steps and frequency steps of ¼ the symbol rate may then be made to more closely determine a lock point. The desired channel's (e.g., the side-channel) pn code is then switched in, and the carrier frequency pull-in is implemented.

If no pn code phase is found to result in the detection of a signal below threshold, the carrier frequency is incremented in, by example, half symbol rate steps and the channel evaluation procedure is repeated. The use of half symbol rate steps assumes that orthogonality is significantly reduced for frequency offsets of ¼ symbol rate. If the frequency uncertainty is exhausted without locating a region of orthagonality, it is assumed that insufficient interference sources, or interferers, exist to produce such a region and a conventional code phase search is performed.

The above-described channel evaluation search uses, by example, 256 pn code phases with, by example, 20 frequency increments and takes approximately 20 seconds to complete. The channel evaluation search requires the use of the channel known to be vacant (i.e., the null channel).

The conventional code phase search is performed if the channel evaluation search does not produce a result. The conventional code phase search uses the pn code of the channel to be acquired (e.g., the side-channel). The pn code space is searched in half chip steps for each frequency in ½ symbol rate steps, and seeks to locate a look value above a threshold that is proportional to the mean value. A full chip search is performed and a largest look value above threshold is taken as the lock point. As a result, any multipath signal weaker than the direct signal will also be detected. If the conventional code phase search is unsuccessful the channel evaluation search may be tried again.

Once the timing phase is established to within ¼ chip by one of the two above-described code phase search techniques, and the carrier frequency is tuned to within ¼ symbol rate, the chip timing loop is closed and a carrier frequency pull-in is accomplished. The frequency pull-in procedure operates to tune the LO frequency (see FIG. 1) to a point where phase lock can be rapidly accomplished without false locking to symbol rate sub-harmonics.

An intra-symbol discriminator may also be employed. The intra-symbol discriminator uses another pn code channel which has a pn code that represents the desired pn code but with the second half inverted. A channel using that particular code will interfere with the discrimination process, but the interference will a zero mean interference (assuming random data) that is readily filtered by the loop filter. The frequency pull-in procedure terminates after a fixed time at which the SU 14 is switched to phase lock, thereby ending the acquisition procedure. Thereafter the SU 14 continuously performs carrier phase error detection to determine a loss of lock. If a loss of lock is detected the SU 14 returns to the channel evaluation search.

While the invention has thus been particularly shown and described above with respect to a number of embodiments thereof, it will be understood by those skilled in the art that changes in form and details may be made therein without departing from the scope and spirit of the invention.

For example, it should be realized that the teaching of this invention is not limited to any of the exemplary frequencies, pn code lengths, numbers of users, despreader and detector embodiments, and the like that were described above. Furthermore, it should be realized that the threshold in Block D of FIG. 8 can be made variable or adaptive as, by example, a function of the number of times that the method loops through this block. An initial setting of the threshold can be accomplished in accordance with calibration procedure that slips through all phase states, and sets the threshold to lie between the highest and the second highest measured correlation values.

It should further be understood that the teaching of this invention is not limited for use with the RF transmitters and receivers illustrated in FIG. 1. That is, in other embodiments of this invention the CDMA forward and reverse link signals can be conveyed through, by example, coaxial cable or fiber optic cable. The CDMA signal could also be conveyed through water, using suitable acoustic transducers.

The above described embodiments should thus be viewed as being exemplary of the teaching of this invention, and should not be construed in a limiting sense upon the practice of this invention.

What is claimed is:

1. A method for operating a synchronous CDMA communications system, comprising steps of:

providing a plurality of subscriber units (SUs);

providing at least one radio base unit (RBU) for transmitting a signal comprised of a plurality of first forward channels individual ones of which being intended for receipt by one subscriber unit (SU), and for transmitting at least one second forward channel that is intended for receipt by a plurality of SUs, each of said forward channels being spread with an associated spreading code that has, ideally, an orthogonal relationship to spreading codes of the other forward channels;

receiving the transmitted signal at a SU;

despreading the received signal using a spreading code associated with the second forward channel to obtain a first measure of received signal energy;

despreading the received signal using a null spreading code that is known not to be transmitted by the RBU to obtain a second measure of received signal energy, the null spreading code having, ideally, an orthogonal relationship to the spreading codes of the forward channels; and in the SU, adjusting a phase of the spreading code associated with the second forward channel based on the first and second measures of received signal energy.

2. A method as in claim 1, wherein the step of obtaining a first measure of received signal energy obtains a correlation peak, and wherein the step of obtaining a second measure of received signal energy obtains a correlation null.

3. A method as in claim 1, wherein the steps of despreading and obtaining are performed over a range of phase states.

4. A method as in claim 3, and further comprising steps of:

subtracting the results obtained for each phase state;

comparing a difference value to a threshold value; and terminating the steps of despreading and obtaining when the difference value exceeds the threshold value, and storing the corresponding phase state; else if the difference value does not exceed the threshold value after performing the steps of despreading and obtaining over the range of phase states, storing the phase state corresponding to a largest difference value; wherein the stored phase state is used in the step of adjusting.

5. A synchronous CDMA communications system, comprising:

a plurality of subscriber units (SUs);

at least one radio base unit (RBU) for transmitting a signal comprised of a plurality of first forward channels individual ones of which being intended for receipt by one subscriber unit (SU), and for transmitting at least one second forward channel that is intended for receipt by a plurality of SUs, each of said forward channels being spread with an associated spreading code that has, ideally, an orthogonal relationship to spreading codes of the other forward channels;

a receiver in each said SU for receiving the transmitted signal;

a despreader in each said SU for despreading the received signal using a spreading code associated with the second forward channel to obtain a first measure of received signal energy;

said despreader further despreading the received signal using a null spreading code that is known not to be transmitted by the RBU to obtain a second measure of received signal energy, the null spreading code having, ideally, an orthogonal relationship to the spreading codes of the forward channels; and control means in each said SU for adjusting a phase of the spreading code associated with the second forward channel based on the first and second measures of received signal energy.

6. A synchronous CDMA communications system as in claim 5, wherein the despreader, when obtaining the first measure of received signal energy, obtains a correlation peak, and when obtaining the second measure of received signal energy obtains a correlation null.

7. A synchronous CDMA communications system as in claim 5, wherein said despreader in each said SU operates over a range of phase states.

8. A synchronous CDMA communications system as in claim 7, wherein said control means in each said SU is operable for subtracting the results obtained for each phase state and for comparing a difference value to a threshold value; said control means being responsive to a first condition wherein the difference value exceeds the threshold value for terminating the operation of said despreader and thereafter storing the corresponding phase state; said control means being further responsive to a second condition wherein the difference value does not exceed the threshold value, after operating said despreader over the range of phase states, for storing the phase state corresponding to a largest difference value; and where the stored phase state is used by said control means for adjusting the phase of the spreading code associated with the second forward channel based on the first and second measures of received signal energy.

* * * * *